(12) United States Patent
Rollman

(10) Patent No.: US 11,553,997 B2
(45) Date of Patent: Jan. 17, 2023

(54) DENTAL FLOSS DEVICE

(71) Applicant: David Rollman, Denver, CO (US)

(72) Inventor: David Rollman, Denver, CO (US)

( * ) Notice: Subject to any disclaimer, the term of this patent is extended or adjusted under 35 U.S.C. 154(b) by 223 days.

(21) Appl. No.: 16/888,268

(22) Filed: May 29, 2020

(65) Prior Publication Data
US 2020/0375710 A1 Dec. 3, 2020

Related U.S. Application Data

(60) Provisional application No. 62/855,300, filed on May 31, 2019.

(51) Int. Cl.
A61C 15/04 (2006.01)

(52) U.S. Cl.
CPC ................... A61C 15/046 (2013.01)

(58) Field of Classification Search
CPC . A46B 15/0069; A46B 15/0071; A61C 15/00; A61C 15/02; A61C 15/04; A61C 15/046
See application file for complete search history.

(56) References Cited

U.S. PATENT DOCUMENTS

| | | | |
|---|---|---|---|
| 1,890,788 A | 12/1932 | Landis | |
| 2,354,454 A * | 7/1944 | Geffner | A61C 15/046 |
| | | | D28/68 |
| 2,376,750 A | 5/1945 | Bell | |
| 2,516,539 A | 7/1950 | Atols | |
| 2,784,722 A * | 3/1957 | Chamberlin | A61C 15/046 |
| | | | 132/324 |
| 2,870,773 A | 1/1959 | Parks, Jr. | |
| 3,236,247 A | 2/1966 | Brockman | |
| 3,533,420 A | 10/1970 | Maloney | |
| 3,892,249 A | 7/1975 | Jones et al. | |
| 3,901,251 A | 8/1975 | Johnston | |
| 3,927,686 A * | 12/1975 | Zambito | A61C 15/048 |
| | | | 132/323 |
| 3,939,853 A | 2/1976 | Spanondis | |

(Continued)

FOREIGN PATENT DOCUMENTS

| | | |
|---|---|---|
| EP | 0292673 | 11/1988 |
| WO | WO 2013/182029 | 12/2013 |
| WO | WO 2016/074517 | 5/2016 |

OTHER PUBLICATIONS

International Search Report and Written Opinion for International (PCT) Patent Application No. PCT/US20/35292, dated Aug. 27, 2020 21 pages.

*Primary Examiner* — Nicholas D Lucchesi
(74) *Attorney, Agent, or Firm* — Sheridan Ross P.C.

(57) ABSTRACT

A flossing device is provided comprising a body extending from a first end to a second end and defining a handle and a head. The head includes a first leg and a second leg spaced apart and extending parallel to each other at the second end. Each of the first leg and the second leg have a tip portion and a groove, the groove extending from a top end surface of the tip portion and into each leg. The groove is operable to receive a portion of floss. The device further comprises an upper protuberance and a lower protuberance disposed on each side of the body and near the head. Each of the upper protuberances and the lower protuberances have a retainer portion for receiving a portion of the floss and have a stop portion for holding the floss on the retainer portion.

19 Claims, 6 Drawing Sheets

(56) References Cited

U.S. PATENT DOCUMENTS

| | | | |
|---|---|---|---|
| 4,004,597 A | | 1/1977 | Kupperman et al. |
| 4,004,599 A | | 1/1977 | Rosenfeld |
| 4,052,994 A | | 10/1977 | Thun |
| 4,253,477 A | | 3/1981 | Eichman |
| D272,196 S | | 1/1984 | Tawada |
| 4,522,216 A | | 6/1985 | Bunker |
| 4,597,398 A | * | 7/1986 | Chu .......... A61C 7/02 132/324 |
| 4,832,062 A | * | 5/1989 | Grollimund .......... A61C 15/046 132/327 |
| 5,197,498 A | | 3/1993 | Stewart |
| 5,375,614 A | | 12/1994 | Navratil |
| 5,782,250 A | * | 7/1998 | Harrah, Jr. .......... A61C 15/046 132/327 |
| 5,931,171 A | * | 8/1999 | Landis .......... A61C 15/046 132/323 |
| 7,171,971 B2 | | 2/2007 | Ochs et al. |
| 8,387,629 B1 | * | 3/2013 | Borg .......... A61C 15/046 132/325 |
| 2005/0247328 A1 | | 11/2005 | Shen et al. |
| 2006/0011212 A1 | | 1/2006 | Achepohl et al. |
| 2009/0241984 A1 | | 10/2009 | Wall |
| 2012/0186603 A1 | | 7/2012 | Hall |
| 2013/0160790 A1 | | 6/2013 | Yap |
| 2013/0333720 A1 | * | 12/2013 | Gordon .......... A61C 15/046 132/323 |
| 2015/0007844 A1 | | 1/2015 | Devins |
| 2016/0008114 A1 | | 1/2016 | Stofko |
| 2017/0245972 A1 | | 8/2017 | Lam et al. |

\* cited by examiner

DENTAL FLOSS DEVICE

CROSS REFERENCE TO RELATED APPLICATIONS

This application claims the benefit of U.S. Provisional Application No. 62/855,300, filed on May 31, 2019, which application is incorporated herein by reference in its entirety.

FIELD OF THE INVENTION

Embodiments of the present invention generally relate to a dental floss device, and more specifically to a reusable dental floss device to assist users in flossing their teeth.

BACKGROUND OF THE INVENTION

Most users floss their teeth with a piece of dental floss between about 12 inches and 24 inches in length, manipulating the floss with their fingers to clean between their teeth. Under most circumstances, this method works reasonably well. If, however, a person has weak hands or fingers, small cuts, cracked skin from winter weather, or other abrasions, manipulating the floss can be difficult, awkward, or painful. Current devices on the market enable the user to manipulate floss with a handle of some sort, which makes flossing easier and more convenient. But all current devices employ a fixed piece of floss in a plastic frame; thus, after a single use, all or part of the device is disposed of, creating large amounts of plastic waste. In addition, the type of floss employed in the fixed frame may not suit all users, especially those with tight teeth.

SUMMARY OF THE INVENTION

These and other needs are addressed by the various embodiments and configurations of the present invention. This invention relates to a novel system, device, and methods for using and providing a flossing handle onto which floss can easily be added and removed. Embodiments of the present invention include a simple method of using a reusable handle to floss teeth, while employing any type or brand of dental floss with the handle. The handle is intended to last for hundreds of uses and may use a much shorter piece of floss than what is required for manual flossing without the inventive flossing device, thus saving both plastic waste and floss. The device is not only beneficial for users on their own teeth, but will make it easier for parents to floss their children's teeth, for caregivers to help the disabled and elderly, and even for dental technicians during professional cleaning.

It is one aspect of various embodiments of the present invention to provide a reusable flossing device comprising a handle onto which any type of floss can be secured. The user can then floss his/her teeth with ease with the device using the type of floss best suited for his/her teeth.

Another advantage of embodiments of the present invention is that the device is very easy to clean and sanitize. For example, the device can be washed with soap and water, washed in the dishwasher, and/or sanitized in a UV or ultrasonic sanitation machine. The fact that various embodiments include no moving parts makes these embodiments even easier to clean. Moreover, embodiments without moving parts have fewer components that can break and, therefore, the device is more durable and will last longer than prior art devices with moving parts.

One aspect of embodiments of the present invention is to provide a device that reduces consumer waste because the only portion thrown away after each use is the dental floss. Embodiments of the present invention also reduce cost to the user over time, as only the floss, and not the handle, needs to be replaced after each use.

In some embodiments, the handle can be made either from a sturdy, semi-rigid plastic such as is used for making toothbrushes or, in other embodiments, made from stainless steel like a professional dental tool.

In some embodiments, the covers may wear out sooner than the handle, but the covers can be replaced separately. The covers (also called "caps" herein) can be rubber, silicone, another stretchy material, or any other material known in the art.

In some embodiments of the present invention, a device for flossing teeth is provided comprising: a body having a bottom end, a top end opposite the bottom end, a right side, a left side, a center axis disposed between the left side and the right side, a front surface, and a rear surface opposite the front surface, the body having a U-shaped head proximate the top end and a handle extending from the bottom end to a bottom portion of the head, the U-shaped head comprising: a first leg with a first distal end and a first groove proximate the first distal end, wherein the first groove receives a first portion of dental floss; and a second leg with a second distal end and a second groove proximate the second distal end, wherein the second groove receives a second portion of dental floss, wherein the first and second legs are positioned at an angle relative to a front surface of the handle, and wherein the first and second legs are offset an equal distance from a center axis of the body; a first upper protuberance comprising a first cylindrical stem portion with a first stem diameter extending outward from the left side of the body proximate the bottom portion of the head, and comprising a first spherical cap portion with a first cap diameter interconnected to a distal end of the first cylindrical stem portion, the first cap diameter being greater than the first stem diameter; and a second upper protuberance comprising a second cylindrical stem portion with a second stem diameter extending outward from the right side of the body proximate the bottom portion of the head, and comprising a second spherical cap portion with a second cap diameter interconnected to a distal end of the second cylindrical stem portion, the second cap diameter being greater than the second stem diameter.

In additional or alternative embodiments, the first upper protuberance may extend from the left side of the body at an angle relative to the center axis and the second upper protuberance extends from the right side of the body at the angle relative to the center axis. In some embodiments, the device for flossing teeth further comprises: a first cover that engages a portion of the first upper protuberance; and a second cover that engages a portion of the second upper protuberance. In various embodiments, the device for flossing teeth comprises: a first lower protuberance positioned a predetermined distance below the first upper protuberance and on the left side; and a second lower protuberance positioned the predetermined distance below the second upper protuberance and on the right side. Additionally, the first and second lower protuberances each have a stem and a cap. In some embodiments, the device for flossing teeth further comprises: a first cap that engages a portion of the first upper protuberance and a portion of the first lower protuberance; and a second cap that engages a portion of the second upper protuberance and a portion of the second lower protuberance. In some embodiments, the device for flossing teeth further comprises: a pad positioned on the upper surface of the handle proximate the junction between the U-shaped top end and the body of the handle.

In additional embodiments, the first groove may have a first substantially flat surface extending from the first distal end of the first leg and forming an upper limit of the first groove. The first substantially flat surface may be interconnected to a curved innermost portion, which is interconnected to a second substantially flat surface extending from the innermost portion to a step portion formed by a substantially perpendicular surface interconnected to the second substantially flat surface and a third substantially flat surface. The third substantially flat surface may extend from the substantially perpendicular surface to the first distal end of the first leg. The second and third substantially flat surfaces may form a lower limit of the first groove. The second groove may have a first substantially flat surface extending from the second distal end of the second leg and forming an upper limit of the second groove. The first substantially flat surface may be interconnected to a curved innermost portion, which may be interconnected to a second substantially flat surface extending from the innermost portion to a step portion formed by a substantially perpendicular surface interconnected to the second substantially flat surface and a third substantially flat surface. The third substantially flat surface may extend from the substantially perpendicular surface to the second distal end of the second leg, wherein the second and third substantially flat surfaces form a lower limit of the second groove.

In additional embodiments, the device for flossing teeth may further comprise a first cover with a first aperture that engages a portion of the first upper protuberance and a second aperture that engages a portion of the first lower protuberance and a second cover with a first aperture that engages a portion of the second upper protuberance and a second aperture that engages a portion of the second lower protuberance. In other embodiments, the device for flossing teeth may further comprise a pad positioned on the front surface of the handle proximate the bottom portion of the head.

Another embodiment according to the present disclosure of a flossing device comprises: a body extending from a first end to a second end and having a head proximate the second end and handle extending from the first end to a junction with the head, the handle having a midpoint with a cross-section greater than a cross-section of the first end and the junction, the handle tapering from the midpoint to the first end and the junction; a first leg and a second leg positioned at the second end of the body and spaced apart from each other, the first and second legs having distal ends, wherein a portion of the first leg proximate the distal end is substantially parallel to a portion of the second leg proximate the distal end, each of the first leg and the second leg having a tip and a groove proximate the distal ends, each groove extending from a top end surface of the distal end and into each leg, wherein each groove is operable to receive a portion of floss; a first groove extending inward from a top end surface of the distal end of the first leg, wherein the first groove has a first substantially flat surface extending from the distal end of the first leg and forming an upper limit of the first groove, the first substantially flat surface interconnected to a curved innermost portion, which is interconnected to a second substantially flat surface extending from the innermost portion to a step portion formed by a substantially perpendicular surface interconnected to the second substantially flat surface and a third substantially flat surface, the third substantially flat surface extending from the substantially perpendicular surface to the distal end of the first leg, wherein the second and third substantially flat surfaces form a lower limit of the first groove; a second groove extending inward from a top end surface of the distal end of the second leg, wherein the second groove has a first substantially flat surface extending from the distal end of the second leg and forming an upper limit of the second groove, the first substantially flat surface interconnected to a curved innermost portion, which is interconnected to a second substantially flat surface extending from the innermost portion to a step portion formed by a substantially perpendicular surface interconnected to the second substantially flat surface and a third substantially flat surface, the third substantially flat surface extending from the substantially perpendicular surface to the distal end of the second leg, wherein the second and third substantially flat surfaces form a lower limit of the second groove; a first upper protuberance and a second upper protuberance disposed on opposite surfaces of the body and near the junction, each of the first upper protuberance and the second upper protuberance having a retainer portion extending from the body surface and a stop portion interconnected to a distal end of the retainer portion, each retainer portion operable for receiving a portion of the floss; and a first cover securable to the first upper protuberance and a second cover securable to the second upper protuberance, the first cover and the second cover operable to secure the portions of the floss to the corresponding first and second upper protuberances, wherein the stop portion of the first upper protuberance is securable to the first cover when the first cover is disposed on the retainer portion of the first upper protuberance, and wherein the stop portion of the second upper protuberance is securable to the second cover when the second cover is disposed on the retainer portion of the second upper protuberance.

In additional embodiments, the retainer portion of the first upper protuberance may be a cylindrical stem and the stop portion of the first upper protuberance may be a sphere with a larger diameter than a diameter of the cylindrical stem. In further embodiments, each of the first leg and the second leg may comprise a first protrusion, a second protrusion formed by the interior surface, wherein a front surface of the first protrusion is curved and a rear surface of the second protrusion is curved. In other embodiments, the first cover may include a first aperture, wherein the retainer portion of the first upper protuberance is positioned in the first aperture when the first cover is disposed on the retainer portion of the first upper protuberance, wherein the second cover may include a second aperture, wherein the retainer portion of the second upper protuberance is positioned in the second aperture when the second cover is disposed on the retainer portion of the second upper protuberance. In additional embodiments, the first leg and the second leg may be offset an equal distance from a center axis of the body. In other embodiments, the flossing device may further comprise further comprising a pad disposed on a front surface and positioned proximate the junction, wherein the front surface extends between the opposite surfaces on which the first and second upper protuberances are disposed.

Another embodiment according to the present disclosure of a flossing device comprises: a body extending from a first end to a second end, the first end having a head comprising a first leg spaced apart from a second leg to define a gap distance; a first groove extending from a first tip of the first leg and extending into the first leg a groove distance; a second groove extending from a second tip of the second leg and extending into the second leg the groove distance, the first groove and the second groove operable to receive a piece of floss that spans the gap distance; a mid-portion of the body having a first cross-section; a second portion positioned proximate the second end and having a second cross-section less than the first cross-section of the mid-portion; a handle defined by the body tapering from the mid-portion to the second portion and by the body tapering from the mid-portion to the head; a first pair of extensions each disposed on opposite sides of the body and operable to receive a first portion and a second portion of the piece of floss, the first pair of extensions positioned proximate a lower portion of the head and each extension in the first pair of extensions being positioned a same distance below the first end; a second pair of extensions spaced a predetermined distance below the first pair of extensions, each extension in the second pair of extensions being disposed on the opposite sides of the body and operable to receive a third portion and a fourth portion of the piece of floss; a first cover configured to detachably engage one extension in the first pair of extensions and one extension in the second pair of extensions; and a second cover configured to detachably engage the other extension in the first pair of extensions and the other extension in the second pair of extensions.

In additional embodiments, the head may be a U-shape in part formed by the first leg and the second leg. In further embodiments, each extension in the first pair of extensions and each extension in the second pair of extensions may have a cylindrical stem portion extending from the opposite sides of the body and a spherical cap portion interconnected to a distal end of the cylindrical stem portion. In other embodiments, the first groove and the second groove may each include a step for preventing the piece of floss from moving out of the first and second grooves. In additional embodiments, the first cover may include a first aperture configured to receive one extension in the first pair of extensions and a second aperture configured to receive one extension in the second pair of extensions, and wherein the second cover may include a first aperture configured to receive the other extension in the first pair of extensions and a second aperture configured to receive the other extension in the second pair of extensions. In some embodiments, the first cover and the second cover may be permanently affixed to the second pair of extensions and removably securable to the first pair of extensions.

In additional embodiments, the first groove may have a first substantially flat surface extending from the first distal end of the first leg and forming an upper limit of the first groove. The first substantially flat surface may be interconnected to a curved innermost portion, which is interconnected to a second substantially flat surface extending from the innermost portion to a step portion formed by a substantially perpendicular surface interconnected to the second substantially flat surface and a third substantially flat surface. The third substantially flat surface may extend from the substantially perpendicular surface to the first distal end of the first leg. The second and third substantially flat surfaces may form a lower limit of the first groove. The second groove may have a first substantially flat surface extending from the second distal end of the second leg and forming an upper limit of the second groove. The first substantially flat surface may be interconnected to a curved innermost portion, which may be interconnected to a second substantially flat surface extending from the innermost portion to a step portion formed by a substantially perpendicular surface interconnected to the second substantially flat surface and a third substantially flat surface. The third substantially flat surface may extend from the substantially perpendicular surface to the second distal end of the second leg, wherein the second and third substantially flat surfaces form a lower limit of the second groove.

For purposes of further disclosure, the following references generally related to flossing devices are hereby incorporated by reference in their entireties:

U.S. Pat. No. 2,376,750, entitled "Dental Floss Holder," and issued on May 22, 1945;

U.S. Pat. No. 1,890,788, entitled "Dental Floss Holder," and issued on Dec. 13, 1932;

U.S. Pat. No. 3,892,249, entitled "Dental Floss Device," and issued on Jul. 1, 1975;

U.S. Pat. No. 3,236,247, entitled "Dental String or Floss Holder with Means for Adjusting String or Floss Tension," and issued on Feb. 22, 1966;

U.S. Pat. No. 4,004,597, entitled "Means for Supporting A Strip of Length of Dental Floss in Tensioned and Taut Condition for Ready Use," and issued on Jan. 25, 1977;

U.S. Pat. No. 3,533,420, entitled "Dental Floss Holder," and issued on Oct. 13, 1970;

U.S. Pat. No. 4,004,599, entitled "Dental Floss Holder," and issued on Jan. 25, 1977;

U.S. Pat. No. 2,870,773, entitled "Dental Floss Dispenser," and issued on Jan. 27, 1959;

U.S. Pat. No. 4,052,994, entitled "Dental Floss Applicator," and issued on Oct. 11, 1977;

U.S. Pat. No. 5,197,498, entitled "Dental Floss Holding Apparatus," and issued on Mar. 30, 1993;

U.S. Pat. No. 7,171,971, entitled "Dental Floss Device with a Stackable Dental Floss Holder," and issued on Feb. 6, 2007;

U.S. Pat. No. 4,253,477, entitled "Dental Floss Holder," and issued on Mar. 3, 1981;

U.S. Pat. No. 5,375,614, entitled "Dental Floss," and issued on Dec. 27, 1994;

U.S. Pat. No. 2,516,539, entitled "Dental Floss Holder," and issued on Jul. 25, 1950;

U.S. Pat. No. D272,196, entitled "Dental Floss Holder or Similar Article," and issued on Jan. 10, 1984;

U.S. Patent Application Publication No. 2006/0011212, entitled "Manual Advance Dental Floss Holder," and published on Jan. 19, 2006;

U.S. Patent Application Publication No. 2005/0247328, entitled "Dental Floss Holder," and published on Nov. 10, 2005;

U.S. Patent Application Publication No. 2015/0007844, entitled "Dental Floss Apparatus," and published on Jan. 8, 2015; and European Patent Publication No. 0292673, entitled "Elastic Dental Floss and Holder for Elastic Dental Floss with or without toothbrush," and published on Nov. 30, 1988.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
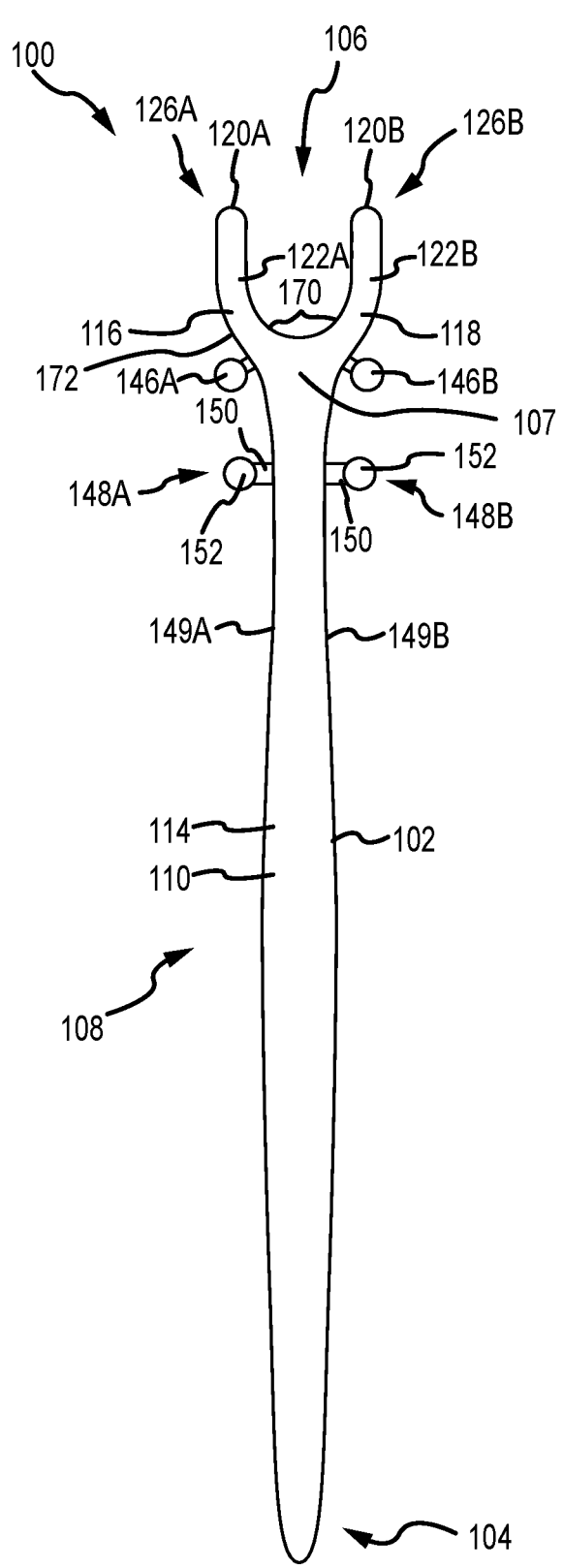
FIG. 1 is a front elevation view of the flossing device according to embodiments of the present invention.
Figure 2:
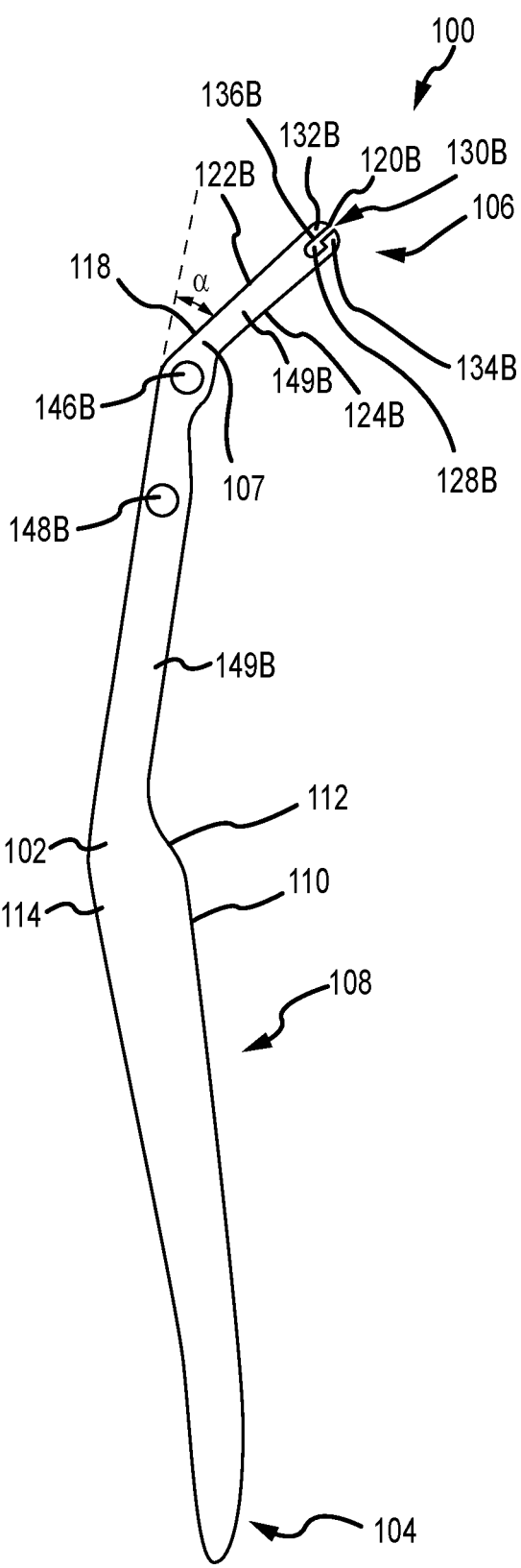
FIG. 2 is a right side view of the flossing device.

FIG. 1 is a front elevation view of the flossing device 100 according to embodiments of the present invention. FIG. 2 is a right side view of the flossing device 100. The device 100 consists of a body 102 extending from a first end 104 to a second end 106 to define a head 107 and a handle 108. The head 107 and handle 108 may be made from any rigid material such as, but not limited to, plastic, metal, wood, composite material, or the like. The head 107 and handle 108 may be made from one material or a combination of materials. In some embodiments, the head 107 and/or handle 108 are solid, though in other embodiments the head 107 and/or handle 108 are hollow or may include cutouts to reduce weight. The handle 108 is contoured to provide a comfortable grip for handling and/or holding. In the illustrated example, the handle 108 has a midpoint 110 with a cross-section thicker than a cross-section of the handle 108 near the head 107. The cross-section of the midpoint 110 is also thicker than a cross-section of the handle 108 near the first end 104. The handle 108 narrows or tapers between the midpoint 110 and the head 107 and includes a sloped surface 112. The sloped surface 112 may act as a rest for a user's thumb, palm, or finger(s) during use. A top surface 114 of the midpoint 110 may also act as rest for the user's thumb or finger(s) during use. The handle 108 also narrows or tapers between the midpoint 110 and the first end 104. In some examples, the cross-sectional area of the midpoint 110 is less than or equal to the cross-sectional area of the portion proximate the head 107, the second end 106, and/or the first end 104. The exterior surface or portions of the surface of the handle 108 may be smooth, textured (e.g., grooved, rough, or the like), or may include a rubberized or otherwise grippy surface (similar to the portion 266 shown in FIG. 10). For example, portions of the handle 108 that a user may grip may have a grippy surface whereas a remaining portion of the surface may be smooth.

The second end 106 includes the head 107 and is operable to be inserted into the user's mouth. In some embodiments, the head 107 and/or the second end 106 is the same material as the handle 108, though in other embodiments, the head 107 and/or the second end 106 is a different material than the handle 108. In yet other embodiments, the second end 106 may be made from one material or a combination of materials. In the illustrated example, the head 107 is U-shaped, though in other examples the head 107 may be forked, Y-shaped, V-shaped, or any other shape. Further, in the illustrated example, the head 107 includes a rounded inner surface 170 and rounded outer surfaces 172, though in other examples, the inner surface 170 and the outer surfaces 172 may be planar, angled, or a combination of planar, curved, or angled. The head 107 also includes a first leg 116 and a second leg 118 for which a piece of floss may be extended across. In other embodiments, the second end 106 may include more than two legs or differently shaped legs 116, 118.

The first leg 116 and the second leg 118 are spaced apart and parallel to each other and are also substantially equal in length as shown in the illustrated embodiment. The first leg 116 an the second leg 118 are spaced apart from each other to define a gap distance 117. In other examples, the first leg 116 and the second leg 118 may not be parallel to each other and/or each leg 116, 118 may be a different length than the other leg. Each leg 116, 118 includes a top surface 120A, 120B (sometimes called a "top surface", other times called a "front surface", and other times called a "top end surface") extending between a front surface 122A, 122B and a rear surface 124A, 124B. The legs 116, 118 are positioned at an angle α relative to the handle 108. In some embodiments, the angle α is between about 15° and about 75°. In a preferred embodiment, the legs 116, 118 are positioned at an angle α relative to the handle 108 between about 30° and about 60°. In a more preferred embodiment, the legs 116, 118 are positioned at an angle α relative to the handle 108 between about 35° and about 50°. The angle α positions the legs 116, 118 for insertion into a user's mouth such that the user can maintain a comfortable range of arm positions for holding and manipulating the device 100.

Each leg 116, 118 includes a distal portion (e.g., a first distal portion and a second distal portion) and a tip portion 126A, 126B proximate to the distal portion. Each leg 116, 118 also includes a corresponding groove 128A, 128B proximate the distal end and extending into the tip portion 126A, 126B from the front surface 120A, 120B (sometimes called a "top surface", other times called a "front surface", and other times called a "top end surface"). The grooves 128A, 128B are operable to receive a piece of floss that spans the gap distance 117 and to hold the floss taut when the floss is secured to the head 107 and/or handle 108. The groove 128A, 128B includes an opening 130A, 130B at the top end surface 120A, 120B of the leg 116, 118, and extends into the leg 116, 118 to form a first protrusion 132A, 132B and a second protrusion 134A, 134B. Each of the first protrusion 132A, 132B (i.e., the top protrusion) and the second protrusion 134A, 134B (i.e., the bottom protrusion) are rounded at the corresponding top end surface 120A, 120B (sometimes called a "top surface", other times called a "front surface", and other times called a "top end surface"). An interior surface 136A, 136B of the groove 128A, 128B includes a first interior surface portion 137A, 137B on the bottom of the first protrusion 132A, 132B (as viewed in FIG. 2) interconnected to an innermost portion 135A, 135B (shown in FIG. 5), which is interconnected to a second interior surface portion (comprised of 142A, 142B and 140A, 140B) on the upper portion (as viewed in FIG. 2) of the second protrusion 134A, 134B. Portions of the interior surface 136A, 136B are generally planar with rounded corners, although in other examples, the corners may be sharp or angled. The first interior surface portion 137A, 137B faces the second interior surface portion. The first interior surface portion 137A, 137B is substantially planar or flat across the first protrusion 132A, 132B. The second interior surface portion includes a step or lip 138A, 138B (shown in FIG. 5) on the second protrusion 134A, 134B. The step 138A, 138B is formed by a first substantially planar surface 140A, 140B, a second substantially planar surface 142A, 142B, and a third substantially planar surface 144A, 144B (shown in FIGS. 4-5), where the first substantially planar surface 140A, 140B and the second substantially planar surface 142A, 142B are substantially parallel to one another and the third substantially planar surface 144A, 144B is substantially perpendicular thereto. The interior surface 136A, 136B also extends to and rounds at the innermost portion 135A, 135B of the groove 128A, 128B, although the interior surface 136A, 136B may not be round at the end 135A, 135B of the groove 128A, 128B, and may include one or more planar surfaces in other embodiments. The step 138A, 138B generally helps maintain a position of the floss in the groove 128A, 128B and prevents the floss from sliding out of the groove 128A, 128B during use, including when the floss is pushed down in between the user's teeth and when the floss is pulled out of the user's teeth. The opening 130A, 130B provides for easy insertion of the floss into the groove 128A, 128B and together with the step 138A, 138B provide for retainment of the floss in the groove 128A, 128B without any moving parts. Thus, installation of the floss into the groove 128A, 128B is simple and easy to perform.

The device 100 includes one or more protuberances 146A, 146B, 148A, 148B that are disposed on opposite sides 149A, 149B of the body 102 and extend outwardly from the two opposite surfaces of the body. In other examples, the protuberances 146A, 146B, 148A, 148B may be positioned anywhere on the device including the handle 108, the head 107, or one or each of the legs 116, 118. The protuberances 146A, 146B, 148A, 148B may each be the same shape and size, though in other embodiments, some or all of the protuberances 146A, 146B, 148A, 148B may be a different shape and/or size as each other. For example, some protuberances 146A, 146B, 148A, 148B may be smaller than other protuberances 146A, 146B, 148A, 148B. The protuberances 146A, 146B, 148A, 148B may be any shape including, but not limited to, a button, a knob, a square, a triangle, a sphere, a hook, or the like. During use, the protuberances 146A, 146B, 148A, 148B receive and provide a place of securement for the floss and/or a cover. The floss may be secured to the protuberances 146A, 146B, 148A, 148B by wrapping the floss around the protuberances 146A, 146B, 148A, 148B multiple times, and/or the cover may be affixed to the protuberance to secure the floss to the protuberances 146A, 146B, 148A, 148B.

In the illustrated example, four protuberances 146A (upper left), 146B (upper right), 148A (lower left), 148B (lower right) are disposed on a right side 149A and a left side 149B of the body 102. In some examples, the device 100 has only two protuberances (e.g., one protuberance on each side of the device) or, in other embodiments, has more than two protuberances. In other embodiments, the device may have more protuberances on one side than the other or may have no protuberances on one side. In various embodiments, the upper protuberances 146A, 146B, are closest to the tip portions 126A, 126B of the second end 106. In the illustrated embodiment, the upper protuberances 146A, 146B are not parallel to one another and instead are positioned at the same angle relative to the head 107 or the outer surfaces 172 as each other and the lower protuberances 148A, 148B are parallel to each other. Stated differently, the upper protuberance 146B extends from the left side 149B of the body 102 at an angle relative to a center axis disposed between the left side 149B and the right side 149A, and the upper protuberance 146A extends from the right side 149A of the body 102 at the angle relative to the center axis. In other examples, each of the upper protuberances 146A, 146B and the lower protuberances 148A, 148B may be offset from each other. In alternative embodiments, the upper protuberances 146A, 146B are positioned parallel to each other. In additional embodiments, the lower protuberances 148A, 148B are not parallel to one another and instead are positioned at the same angle relative to the head 107 or the outer surfaces 172 as each other. The lower protuberances 148A, 148B are positioned below the upper protuberances 146A, 146B and are farther away from the tip portions 126A, 126B than the upper protuberances 146A, 146B. In some embodiments, the lower protuberances 148A, 148B hold the end of a cover (see FIGS. 3 and 4), while in some embodiments the lower protuberances 148A, 148B also hold the floss. The upper protuberances 146A, 146B can also hold an end of a cover and/or floss in some embodiments.

The protuberances may also be called extensions, knobs, pins, screws, etc. In various embodiments, the protuberances 146A, 146B, 148A, 148B may be buttons, caps, or rounded extensions. Each protuberance 146A, 146B, 148A, 148B includes a retainer portion 150 to which an end of a piece of floss is securable during use. For example, the piece of floss can be wound around the retainer portions 150 of one or more protuberances 146A, 146B, 148A, 148B. In some embodiments the retainer portion 150 is cylindrically shaped. Although in other embodiments, the retainer portion 150 can have a rectangular shape, conical shape, oval shape, or other shape. In yet other embodiments, the retainer portion 150 has a consistent cross-section shape and size along the length of the retainer portion 150. In still other embodiments, the retainer portion 150 has a cross-sectional shape and/or size that changes along the length of the retainer portion 150.

In some embodiments, each protuberance 146A, 146B, 148A, 148B also includes a stop portion 152 disposed at an end of the retainer portion 150. In some embodiments, only some of the protuberances 146A, 146B, 148A, 148B include the stop portion 152. The stop portion 152 secures a cover (154A, 154B in FIGS. 3 and 4) to the retainer portion 150 and may prevent the floss from moving off of the retainer portion 150 during use or during installation of the floss. In embodiments without the cover, the stop portion 152 may prevent the floss from moving off of the retainer portion 150 during use. In the illustrated example, the retainer portion 150 is a stem and the stop portion 152 is a sphere. The sphere 152 has a diameter larger than the diameter of the stem 150 to prevent the floss and/or the cover 154A, 154B from moving off of the stem 150 when the floss is secured to the stem 150. In various embodiments, each retainer portion 150 and/or each stop portion 152 has the same shape. In other embodiments, the retainer portion 150 and/or the stop portion 152 have different shapes than shown in FIGS. 1-4. For example, all four retainer portions 150 and/or the stop portions 152 each have a different shape in some embodiments. Alternatively in other examples, the retainer portions 150 and/or the stop portions 152 of the upper protuberances 146A, 146B have one shape while the retainer portions 150 and/or the stop portions 152 of the lower protuberances 148A, 148B have a different shape. Alternatively, the retainer portions 150 and/or the stop portions 150 of the left protuberances 146A, 148A have one shape while the retainer portions 150 and/or the stop portions 152 of the right protuberances 146B, 148B have another shape.

Figure 3:
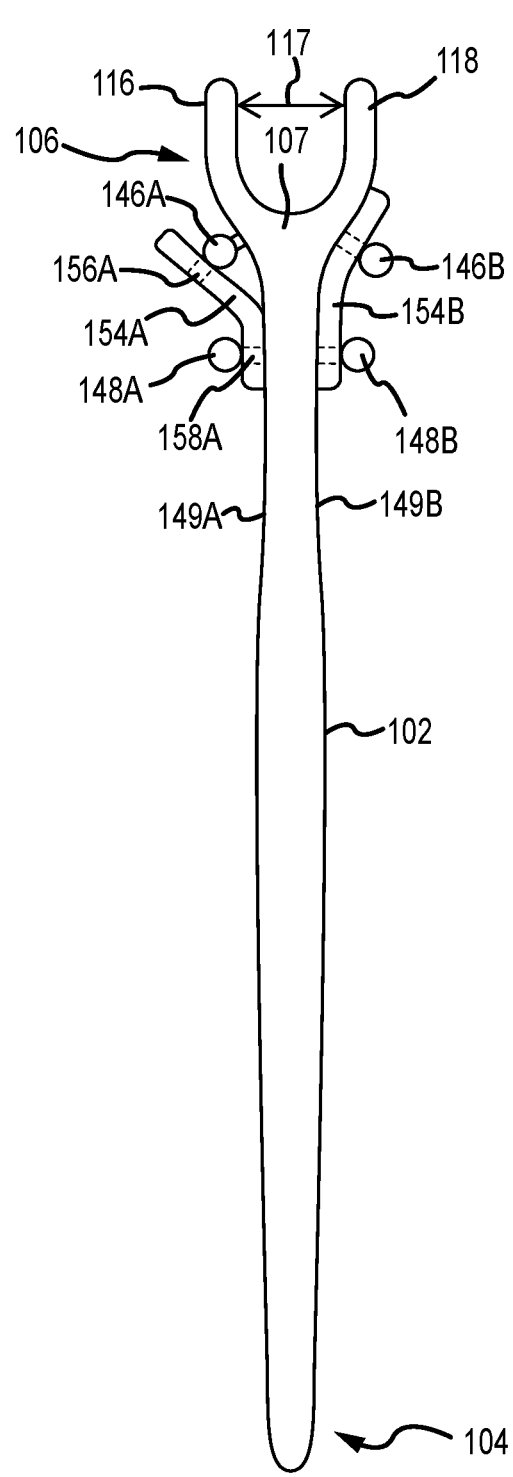
FIG. 3 is a front elevation view of the flossing device with the covers.
Figure 4:
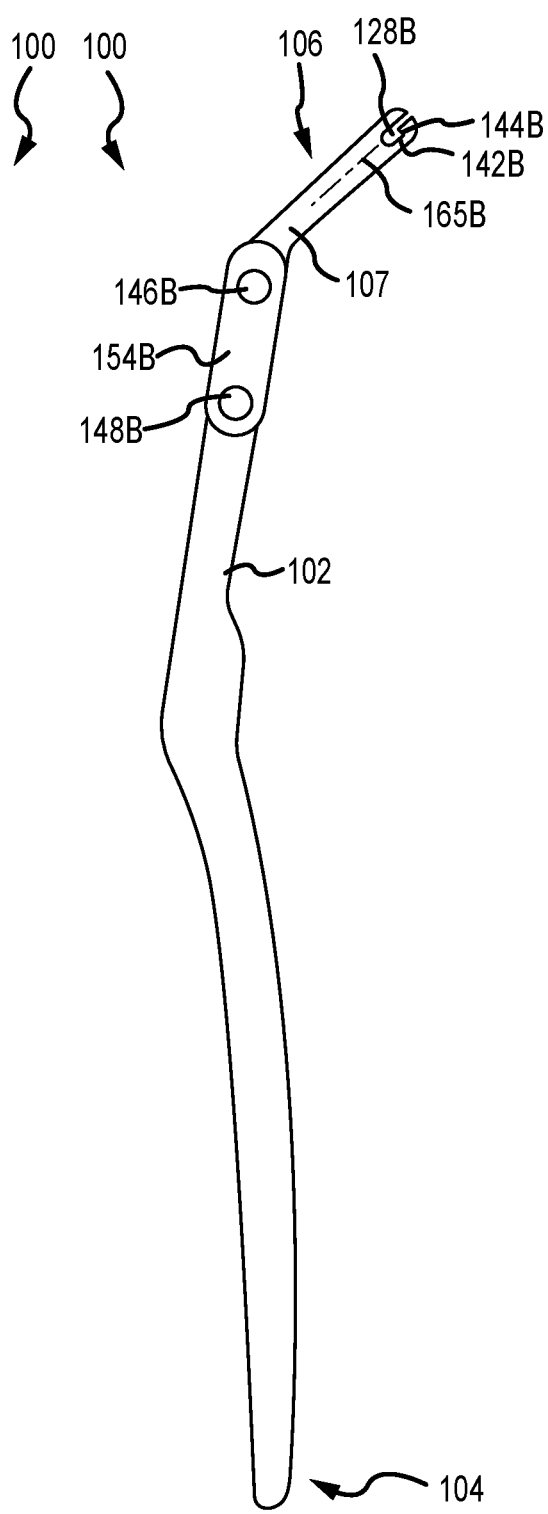
FIG. 4 is a right side view of the flossing device with the covers.
Figure 5:
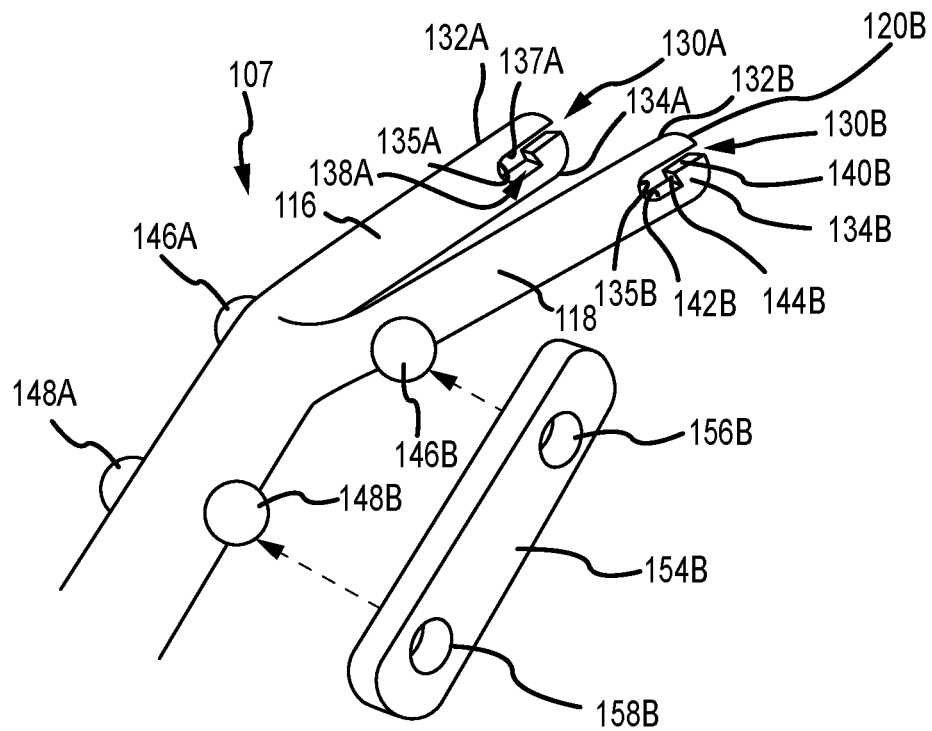
FIG. 5 is an enlarged exploded perspective view of the top end of the device a cover.

FIGS. 3 and 4 show the flossing device 100 with a cover 154A, 154B on each side 149A, 149B and FIG. 5 is an enlarged view of the second end 106 of the device 100 and the right cover 154B. In some embodiments, the covers 154A, 154B are made of rubber, soft plastic, or some other elastic material. In some embodiments, the covers 154A, 154B are permanently secured to one or more protuberances 148A, 148B of the device 100, meaning each cover 154A, 154B is permanently attached to at least one protuberance 146A, 146B, 148A, 148B, preferably the lower protuberance 148A, 148B, and each cover 154A, 154B is removable or detachable from the applicable upper protuberance 146A, 146B. However, the opposite can be true in alternative embodiments, meaning each cover 154A, 154B is permanently attached to at least one protuberance 146A, 146B, 148A, 148B, for example, upper protuberance 146A, 146B, and each cover 154A, 154B is removable or detachable from the applicable lower protuberance 148A, 148B. In other embodiments, the covers 154A, 154B can be removed or completely detached from the protuberances 146A, 146B, 148A, 148B.

In the embodiment shown, each cover 154A, 154B has an upper aperture 156A, 156B and a lower aperture 158A, 158B. A portion of each protuberance 146A, 146B, 148A, 148B extends through and is secured in each aperture 156A, 156B, 158A, 158B. For example, the retainer portions 150 of the protuberances 146A, 146B, 148A, 148B may be positioned in the apertures 156A, 156B, 158A, 158B and the stop portions 152 of the protuberances 146A 146B, 148A, 148B are positioned through the apertures 156A, 156B, 158A, 158B such that they are positioned on an outer side of the covers 154A, 154B when the covers 154A, 154B are attached to the device 100. The stop portions 152 of the protuberances 146A 146B, 148A, 148B are larger than the apertures 156A, 156B, 158A, 158B such that they hold the covers 154A, 154B in place and on the device 100. Each aperture 156A, 156B, 158A, 158B may stretch and expand when the stop portion 152 is pushed or otherwise passes through it and the aperture 156A, 156B, 158A, 158B returns to its original shape (e.g., diameter) when the stop portion 152 is through the aperture 156A, 156B, 158A, 158B. The aperture 156A, 156B, 158A, 158B has a diameter substantially equal to or slightly larger than a diameter of the retainer portion 150. In alternative embodiments, the diameter of the aperture 156A, 156B, 158A, 158B may be smaller than the diameter of the retainer portion 150 for a snug or tight fit or the diameter of the aperture 156A, 156B, 158A, 158B may be greater than the diameter of the retainer portion 150 for a looser fit to accommodate for the floss wound around the retainer portion 150.

The device 100 can be used without the covers 154A, 154B, maintaining the tension in the floss simply by winding the floss around the stems 150 of the upper protuberances 146A, 146B. For extra security of the hold, the floss can be wound around the lower protuberances 148A, 148B as well as the upper protuberances 146A, 146B. For example, the user may start by winding the floss around one lower protuberance 148A, move to the upper protuberance 146A on the same side 149A and wrap the floss around that protuberance 146A, then move the floss through the grooves 128A, 128B in the legs 116, 118, wrap the floss around the other upper protuberance 146B, and finally wrap the floss around the other lower protuberance 148B. For example, the user may start by winding the floss around the lower left protuberance 148A, move to the upper left protuberance 146A and wrap the floss around the upper left protuberance 146A, then move the floss through the left groove 128A in the left leg 116 and then the right groove 128B in the right leg 118, then wrap the floss around the upper right protuberance 146B, and finally wrap the floss around the lower right protuberance 148B. Alternatively, the user may start by winding the floss around the lower right protuberance 148B, move to the upper right protuberance 146B and wrap the floss around the upper right protuberance 146B, then move the floss through the right groove 128B in the right leg 118 and then the left groove 128A in the left leg 116, then wrap the floss around the upper left protuberance 146A, and finally wrap the floss around the lower left protuberance 148A.

The device 100 as used with the covers 154A, 154B, provides additional security for holding the floss on the device 100. For example, when the covers 154A, 154B are permanently affixed to the lower protuberances 134A, 134B or when the covers 154A, 154B are completely removeable from all protuberances 146A, 146B, 148A, 148B, the user can wind the floss around the upper protuberances 146A, 146B alone (and through the grooves 128A, 128B) and then cover the upper protuberances 146A, 146B with the covers 154A, 154B to securely keep the floss in place. If the covers 154A, 154B are completely removeable from all protuberances 146A, 146B, 148A, 148B, then the user can secure the covers 154A, 154B to the lower protuberances 148A, 148B, then wind the floss around the upper protuberances 146A, 146B and through the grooves 128A, 128B, then put the covers 154A, 154B on the upper protuberances 146A, 146B. Alternatively, if the covers 154A, 154B are removeable from all protuberances 146A, 146B, 148A, 148B, then the user can wind the floss around one lower protuberance 148A, 148B, then around the upper protuberance 146A, 146B on the same side, then through the grooves 128A, 128B, then wind the floss around the upper protuberance 146A, 146B on the other side, then around the lower protuberance 148A, 148B on that side, then put the cover 154A, 154B on the top and bottom protuberances 146A, 146B, 148A, 148B on one side, and finally put the other cover 154A, 154B on the top and bottom protuberances 146A, 146B, 148A, 148B on the other side. The user can also use only one cover 154A, 154B if she/he so desires. For example, the user may secure the floss to one of the protuberances 146A, 146B, 148A, 148B on one side, secure the cover to the protuberance 146A, 146B, 148A, 148B, and simply wrap the floss around the protuberance 146A, 146B, 148A, 148B on the other side of the device 100 without using a cover on the other side.

Turning to FIG. 5, the cover 154B and the grooves 128A, 128B are shown in detail. The cover 154B, as illustrated and as viewed in a right side view (like FIG. 4), is generally elongated and rectangular shaped with rounded ends, though the cover 154B may be any shape including, but not limited to, circular, square, triangular, oblong, oval, or the like. In other examples, the cover 154B may be wider, thinner, shorter, or longer than the illustrated example. The top surface of the cover 154B is visible in FIG. 4 and is generally flat or planar. In FIG. 5, the sides of the cover 154B are also visible and, in the embodiment shown, the sides are substantially flat or planar and substantially perpendicular to the top surface of the cover 154B. The apertures 156B, 158B are positioned near ends of the rectangular shaped cover 154B, though in other examples each aperture 156B, 158B may be positioned anywhere on the cover 154B. In some examples, each aperture 156B, 158B is positioned near a center of the cover 154B, in other examples, both apertures 156B, 158B are positioned near one of the ends of the cover 154B. The apertures 156B, 158B may be any shape including, but not limited to circular, triangular, square, rectangular, oblong, oval, or the like. The cover 154B also has a thickness substantially the same as or slightly less than a length of the stem 150 so that the cover 154B fits snuggly between the body 102 of the device 100 and the stop portion 152, thereby reducing or preventing rattling of the cover 154B during use. The cover 154B, in other examples, may have a thickness less than or greater than the thickness of the stop portion 152. The left cover 154A may be identical to the right cover 154B, though in other examples the covers 154A, 154B may be shaped or sized differently from each other and may have a different number of apertures as each other.

As illustrated in FIG. 5, the upper protuberances 146A, 146B are shown spaced apart from the lower protuberances 148A, 148B and the protuberances 146B, 148B on the right side 149B are positioned opposite the protuberances 146A, 148A on the left side 149A. In some embodiments, a distance between the upper protuberances 146A, 146B and the lower protuberances 148A, 148B is about ⅞", though the distance may be less than or greater than ⅞". In various embodiments, the distance between the upper protuberances 146A, 146B and the lower protuberances 148A, 148B is between about 0.5" and about 1.0". The upper protuberances 146A, 146B and the lower protuberances 148A, 148B may be positioned closer together or further apart than shown. The protuberances 146B, 148B, 146A, 148A on each of the right side 149B and the left side 149A may be also be spaced closer to each other (e.g., the protuberances 146B, 148B, 146A, 148A may each be positioned nearer or on the front surface 122A, 122B or the rear surface 124A, 124B) or may be offset from each other.

Turning to the grooves 128A, 128B, in some embodiments, the grooves extend about ⅛" inward from the top end surface 120A, 120B (sometimes called a "top surface", other times called a "front surface", and other times called a "top end surface") to the innermost portion 135A, 135B at a groove distance, though the grooved distance 128A, 128B may be less than or greater than ⅛". In other embodiments, the grooves extend about 3/16" inward from the top end surface 120A, 120B (sometimes called a "top surface", other times called a "front surface", and other times called a "top end surface") to the innermost portion 135A, 135B. In still other embodiments, the grooves extend about ¼" inward from the top end surface 120A, 120B (sometimes called a "top surface", other times called a "front surface", and other times called a "top end surface") to the innermost portion 135A, 135B. In some embodiments, the openings 130A, 130B of the grooves 128A, 128B are positioned closer to the front surface 122A, 122B of the legs 116, 118. Although in other examples, the openings 130A, 130B may be positioned proximate a center or center line 165A, 165B (shown in FIG. 4) or nearer the rear surface 124A, 124B of the legs 116, 118. The groove 128A, 128B is defined by the interior surface 136A, 136B that is substantially planar from the top end surface 120A, 120B (sometimes called a "top surface", other times called a "front surface", and other times called a "top end surface"), along a bottom portion of the first protrusion 132A, 132B, towards the rounded innermost portion 135A, 135B of the groove 128A, 128B, although the innermost portion 135A, 135B of the groove 128A, 128B may not be rounded and may be planar, angular, or a combination of planar, rounded, or angular. In some embodiments, the interior surface 136A, 136B is generally planar with rounded corners, though in other examples, the corners may be sharp or angled. The interior surface 136A, 136B has a width of about ⅛", though the width can be less than or greater than ⅛". In various embodiments, the interior surface 136A, 136B has a width of between about 1/16" and 3/16". In some examples, the width varies across the interior surface 136A, 136B. In other embodiments, the width is constant along the interior surface 136A, 126B. The interior surface 136A, 136B nearer the front surface 122A, 122B is substantially planar from the top end surface 120A, 120B (sometimes called a "top surface", other times called a "front surface", and other times called a "top end surface") towards the end 135A, 135B of the groove 128A, 128B. In some examples, the interior surface 136A, 136B nearer the front surface 122A, 122B may be non-planar and may be rounded and/or include undulations, waves, indents, or the like. In the illustrated example, the interior surface 136A, 136B nearer the rear surface 124A, 124B includes the step 138A, 138B. The step 138A, 138B comprises a first substantially planar surface 140A, 140B and a second substantially planar surface 142A, 142B offset from each other and positioned substantially parallel to each other, and a third substantially planar surface 144A, 144B interconnecting the first substantially planar surface 140A, 140B and the second substantially planar surface 142A, 142B (i.e., spanning the offset) and positioned substantially perpendicular to the first substantially planar surface 140A, 140B and the second substantially planar surface 142A, 142B. In other examples, the step 138A, 138B may comprise more than two surfaces, surfaces of varying shapes and/or angles, and/or surfaces at varying angles to each other. The first substantially planar surface 140A, 140B is about $\frac{1}{16}$" in length (meaning as measured from the top end surface 120A, 120B (sometimes called a "top surface", other times called a "front surface", and other times called a "top end surface") inward toward the third substantially planar surface 144A, 144B), though the first substantially planar surface 140A, 140B may be less than or greater than $\frac{1}{16}$" in length. In some embodiments, the length of the first substantially planar surface 140A, 140B is between about $\frac{1}{32}$" and $\frac{3}{32}$". The second substantially planar surface 142A, 142B is about $\frac{1}{16}$" in length (meaning as measured from the third substantially planar surface 144A, 144B inward toward the innermost portion 135A, 135B), though the second substantially planar surface 142A, 142B may be less than or greater than $\frac{1}{16}$" in length. In some embodiments, the length of the second substantially planar surface 142A, 142B is between about $\frac{1}{32}$" and $\frac{3}{32}$". The third substantially planar surface 144A, 144B is about $\frac{1}{16}$" in length (e.g., a height of the step is about $\frac{1}{16}$"), though the third substantially planar surface 144A, 144B may be less than or greater than $\frac{1}{16}$" in length. In some embodiments, the third substantially planar surface 144A, 144B is between about $\frac{1}{32}$" and $\frac{3}{32}$" in length (e.g., a height of the step). A distance between the second substantially planar surface 142A, 142B and the first interior surface portion 137A, 137B on the bottom (as viewed in FIG. 2) of the first protrusion 132A, 132B is about $\frac{1}{16}$", though the distance may be greater than or less than $\frac{1}{16}$". A distance between the second substantially planar surface 142A, 142B and the first interior surface portion 137A, 137B is between about $\frac{1}{32}$" and about $\frac{3}{32}$". A distance between the first substantially planar surface 140A, 140B and the first interior surface portion 137A, 137B on the bottom (as viewed in FIG. 2) of the first protrusion 132A, 132B is about $\frac{1}{16}$" in length, though the distance may be greater than $\frac{1}{16}$" or less than $\frac{1}{16}$". A distance between the first substantially planar surface 140A, 140B and the first interior surface portion 137A, 137B is between about $\frac{1}{32}$" and $\frac{3}{32}$".

Other embodiments include grooves 128A, 128B of different shapes in the legs 116, 118 of the second end 106 of the device 100. See FIGS. 6-9. Although only the right leg 118 is shown in FIGS. 6-9, the left leg 116 includes the same groove 128A shape as the groove 128B on the right leg 118, in various embodiments. However, in alternative embodiments, the groove 128A on the left leg 116 may be shaped differently from the groove 128B on the right leg 118. Moreover, the right leg 118 is shown and described in connection with FIGS. 6-9, but the component numerals for the left leg 116 are also used in the description herein.

Figure 6:
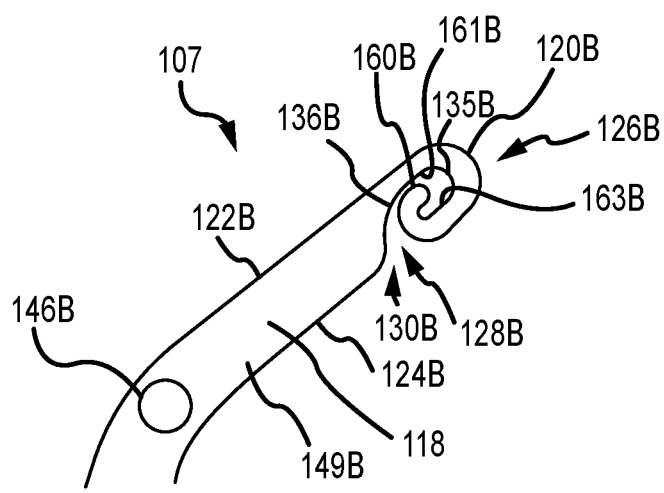
FIG. 6 is an enlarged side view of the top end of the device according to an alternative embodiment.

As shown in FIG. 6, the groove 128A, 128B can open on the rear surface 124A, 124B of the legs 116, 118 towards the front surface 122A, 122B and curl toward the top end surface 120A, 120B (sometimes called a "top surface", other times called a "front surface", and other times called a "top end surface") to form a hook 160A, 160B. Stated differently, the tip portion 126A, 126B is bent and wrapped around to form the hook 160A, 160B. The interior surface 136A, 136B is generally rounded or curved to form the hook 160A, 160B and includes a first planar portion 161A, 161B near the front surface 122A, 122B and second planar portion 163A, 163B near the hook 160A, 160B. The first planar portion 161A, 161B faces toward the second planar portion 163A, 163B and are interconnected by a curved end portion 135A, 135B, although the end portion 135A, 135B can be flat, planar, angled, etc. In other embodiments, the interior surface 136A, 136B does not include any planar portions and is entirely rounded or curved. During installation of the floss, the floss is passed through the opening 130A, 130B of the groove 128A, 128B, around the hook 160A, 160B, and placed inside the hook 160A, 160B. The hook 160A, 160B holds the floss, thereby preventing the floss from moving out of the grooves 128A, 128B.

Figure 7:
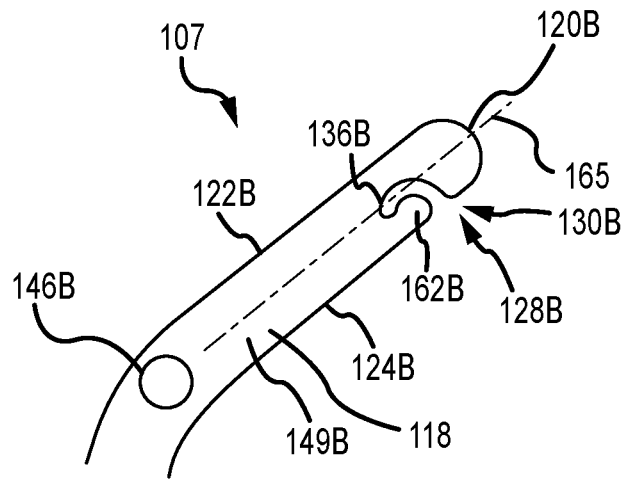
FIG. 7 is an enlarged side view of the top end of the device according to an alternative embodiment.

As shown in FIG. 7, the groove 128A, 128B can open from the rear surface 124A, 124B of the legs 116, 118 and curl inward and away from the top end surface 120A, 120B (sometimes called a "top surface", other times called a "front surface", and other times called a "top end surface") to form a hook 162A, 162B. The entire interior surface 136A, 136B is rounded or curved, although in other examples, the interior surface 136A, 136B may include planar surfaces or portions. The groove extends to or near a center or center line 165A, 165B disposed between the front surface 122A, 122B and the rear surface 124A, 124B. In some examples, the groove 128A, 128B can extend nearer the front surface 122A, 122B. As described with respect to FIG. 6, the floss is passed through the opening 130A, 130B of the groove 128A, 128B, around the hook 162A, 162B, and placed inside the hook 162A, 162B. The hook 162A, 162B holds the floss, thereby preventing the floss from moving out of the grooves 128A, 128B.

Figure 8:
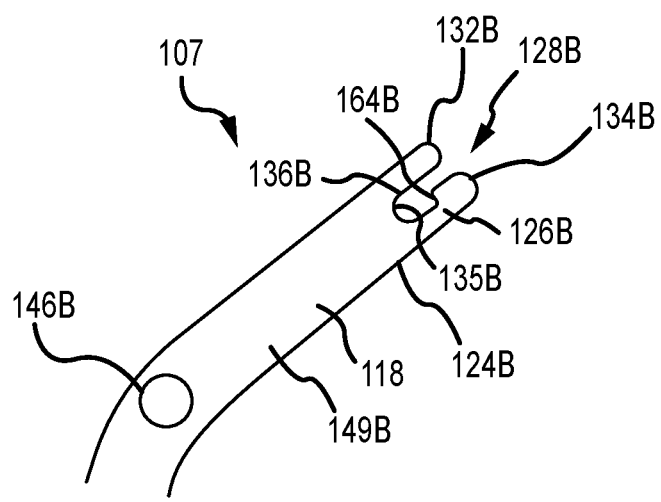
FIG. 8 is an enlarged side view of the top end of the device according to an alternative embodiment.

As shown in FIG. 8, the groove 128A, 128B can open into the top end surface 120A, 120B (sometimes called a "top surface", other times called a "front surface", and other times called a "top end surface") and extend into the tip portion 126A, 126B to form a first protrusion 132A, 132B and a second protrusion 134A, 134B. The interior surface 136A, 136B is rounded at the top end surface 120A, 120B (sometimes called a "top surface", other times called a "front surface", and other times called a "top end surface") and substantially planar inside the groove 128A, 128B. The interior surface 136A, 136B rounds at the end or innermost portion 135A, 135B of the groove 128A, 128B. The groove 128A, 128B also includes step 164A, 164B on the second protrusion 134A, 134B. The step 164A, 164B generally helps maintain a position of the floss in the groove 128A, 128B and prevents the floss from sliding out of the groove 128A, 128B during use.

Figure 9:
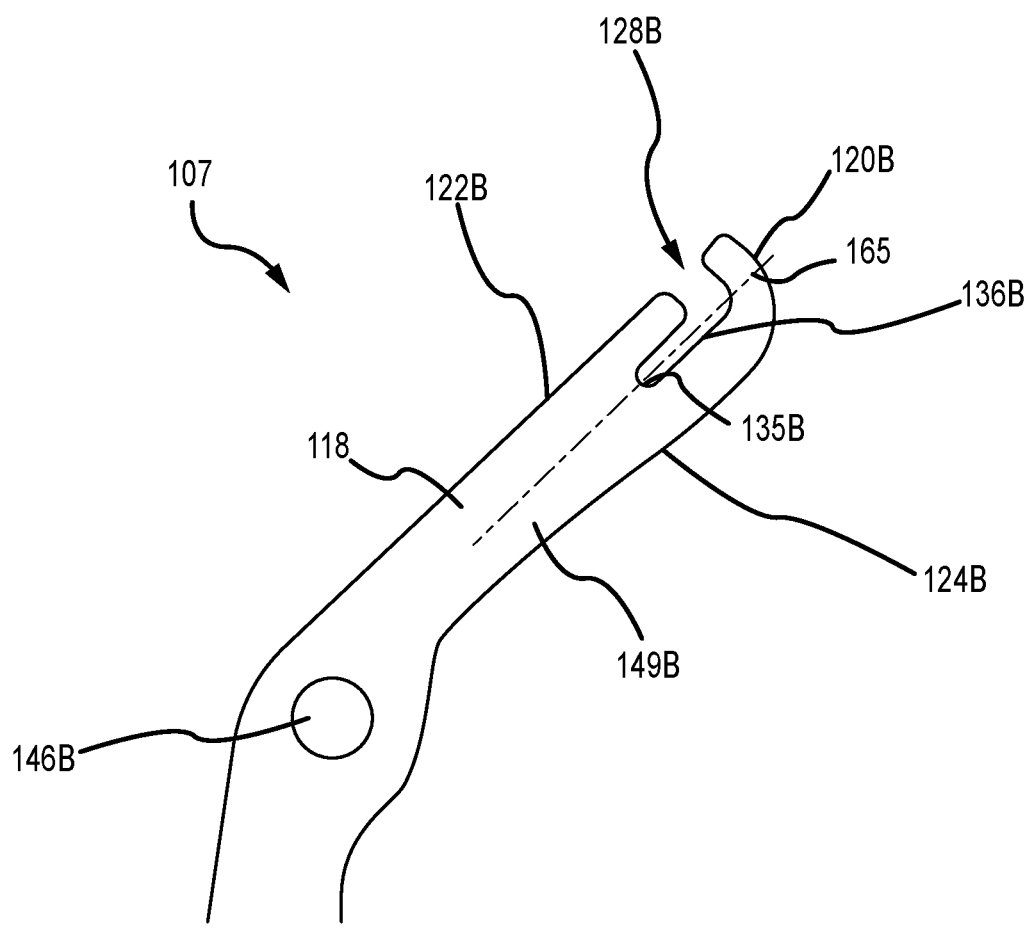
FIG. 9 is an enlarged side view of the top end of the device according to an alternative embodiment.

In some embodiments, as shown in FIG. 9, the groove 128A, 128B can open from the front surface 122A, 122B of the legs 116, 118 and into the legs 116, 118 and away from the top end surface 120A, 120B (sometimes called a "top surface", other times called a "front surface", and other times called a "top end surface") to form an L-shaped groove. The interior surface 136A, 136B is generally planar with rounded corners, though in other examples, the corners may be sharp or angled. In some embodiments, the interior surface 136A, 136B is planar as it extends from the front surface 122A, 122B to the rear surface 124A, 124B, bends perpendicular to the front surface 122A, 122B and the rear surface 124A, 124B, and extends parallel to the front surface 122A, 122B and the rear surface 124A, 124B. In other embodiments, the interior surface 136A, 136B is curved or rounded as it extends from the front surface 122A, 122B to the rear surface 124A, 124B, bends perpendicular to the front surface 122A, 122B and the rear surface 124A, 124B, and extends parallel to the front surface 122A, 122B and the rear surface 124A, 124B. The groove 128A, 128B extends along or near the center or center line 135A, 135B disposed between the front surface 122A, 122B and the rear surface 124A, 124B, although the groove 128A, 128B can extend nearer the rear surface 124A, 124B. The end or innermost portion 135A, 135B of the L-shaped groove 128A, 128B can prevent the floss from moving out of the groove 128A, 128B during use when the floss is positioned in the groove 128A, 128B because the floss is held proximate the innermost portion 135A, 135B by being tightly wound around one or more protuberances 146A, 146B, 148A, 148B.

Figures 10, 11:
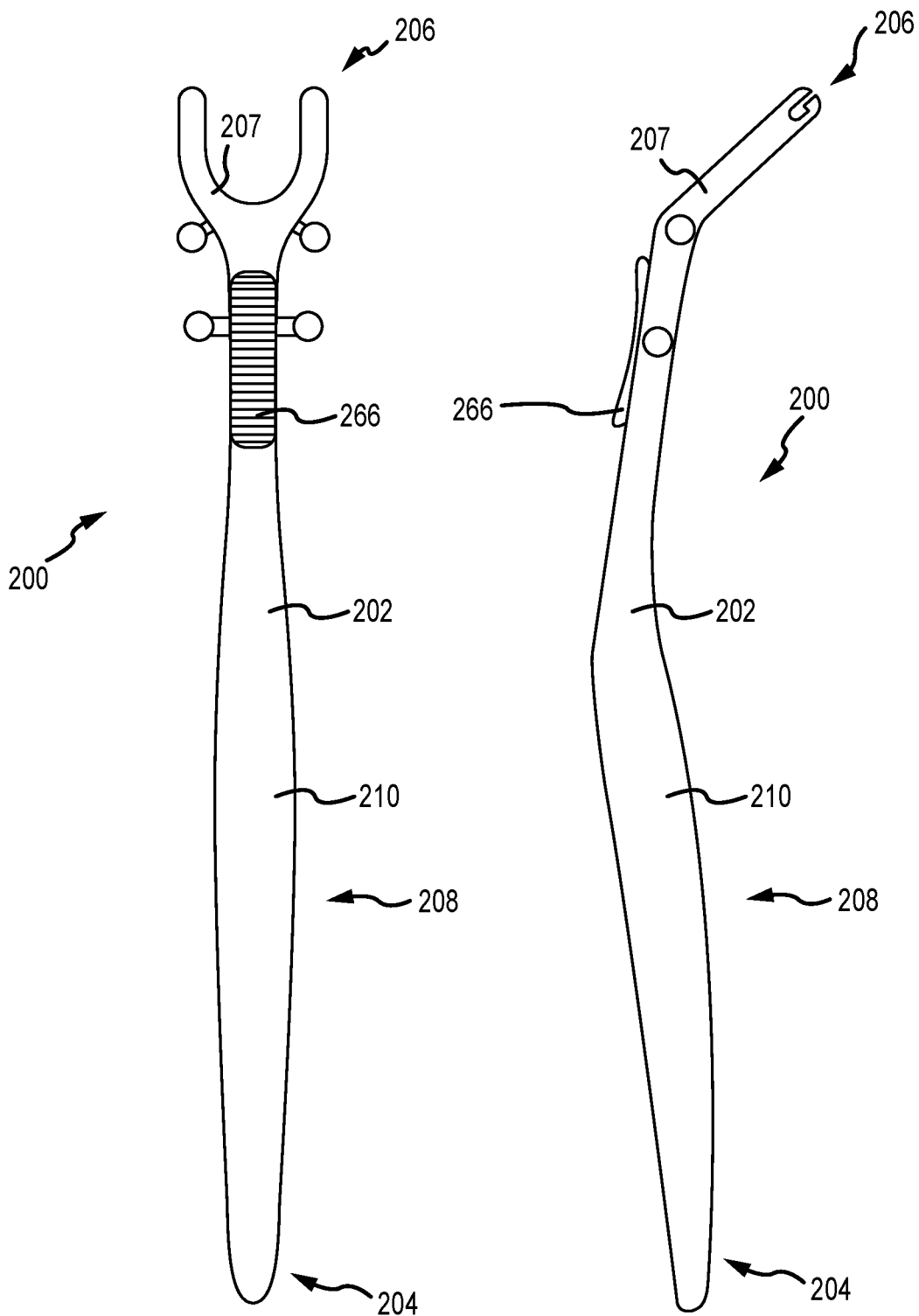
FIG. 10 is a front elevation view of the flossing device according to alternative embodiments of the present invention.
FIG. 11 is a right side view of the flossing device of FIG. 10.

FIGS. 10 and 11 show a front elevation view and a right side view, respectively, of one embodiment of the flossing device 200 comprising a pad or cushion 266 and a different handle 208 shape. The device 200 includes a body 202 extending from a first end 204 to a second end 206. The device 200 includes a head 207 at the second end 206.

The cushion 266 and/or the handle 208 of FIGS. 10-11 can be used with any of the other embodiments described herein (i.e., FIGS. 1-9) and are not separately described or drawn with the different cushion 266 and/or handle 208 to avoid repetitive description and repetitive figures. The user will likely position his/her index finger or thumb on the cushion 266 when using the device 200. The cushion 266 adds support and comfort during use. The cushion 266 can be a soft and/or squishy material, such as soft rubber, soft plastic, or other elastic material. The cushion 266 may have grooves to add texture and prevent the user's finger from slipping. The cushion 266 can be any size or shape. In the embodiment shown, the cushion 266 has an oval shape and extends the width of a handle 208. The cushion 266 may be disposed near the head 207 and near a second end 206 that is opposite a first end 204. In other embodiments, the cushion 266 can be smaller or larger, for example skinnier (i.e., less wide) and/or longer or shorter. Moreover, the cushion 266 can be thicker or thinner than shown in FIG. 10. The cushion 266 may be thicker proximate the upper and lower ends and thinner in the middle to accommodate the user's finger and properly position the user's finger in the thinner portion. Alternatively, the cushion 266 can be a constant thickness across the whole cushion 266. Additionally, the handle 208 shown in FIGS. 10 and 11 has a slightly different shape than the handle 108 shown in FIGS. 1-4.

The handle 208 is contoured to provide a comfortable grip for handling and/or holding the device 200. In the illustrated example, the handle 208 has a midpoint 210 with a cross-section thicker than a cross-section of the handle 208 near the head 207. The cross-section of the midpoint 210 is also thicker than a cross-section of the handle 208 near the first end 204. The handle 208 continuously and gradually narrows or tapers between the midpoint 210 and the head 207. The handle 208 also narrows or tapers between the midpoint 210 and the first end 204. In some examples, the cross-sectional area of the midpoint 210 is greater than the cross-sectional area of the portion proximate the head 207, the second end 206, and/or the first end 204. In alternative embodiments, the cross-sectional area of the midpoint 210 is less than or equal to the cross-sectional area of the portion proximate the head 207, the second end 206, and/or the first end 204. The exterior surface or portions of the surface of the handle 208 may be smooth, textured (e.g., grooved, rough, or the like), or may include a rubberized or otherwise grippy surface in addition to the cushion 266. For example, portions of the handle 208 that a user may grip may have a grippy surface whereas a remaining portion of the surface may be smooth.

People who manipulate floss manually and like to advance the strip of floss to a clean place between each pair of teeth will note that because this device requires only one hand, it is very easy to quickly rinse the head to remove any accumulated food particles and therefore to keep the strip of floss fresh for the entire cleaning procedure. Alternatively, the user could use the device 100, 200 without the covers 154A, 154B such that he/she can wind the floss along the protuberances 146A, 146B and move the floss to a clean portion between teeth.

During use of the device 100, 200, the user can take the end of a piece of floss (or can use the floss directly from its dispenser), wind the floss around the retainer portion 150 of one of the upper protuberances 146A, 146B, then snap the applicable cover 154A, 154B over the upper protuberance 146A, 146B to prevent the floss from unwinding. The user can then draw the floss through the grooves 128A, 128B proximate the tips 126A, 126B and pull the floss taut while winding the floss around the retainer portion 150 of the other upper protuberance 146A, 146B. The user can now close the applicable cover 154A, 154B over that side 149A, 149B. If the user has been using floss from the dispenser, rather than a pre-cut piece, the floss can then be cut from the dispenser at the perfect length. It should not be necessary to further trim the ends of the floss, but users could do so if they desire. The device 100, 200 is then ready for use. When finished, the user removes the covers 154A, 154B at the upper apertures 146A, 146B (or removes the entire cover(s)), unwinds the floss, and throws the used floss away. Thus, the device 100, 200 can be reused with another piece of floss, thereby reducing waste associated with handheld flossing devices.

The device 100, 200 may be manufactured as one piece or multiple pieces. In some embodiments, the body 102, 202 is one piece and in other embodiments, the second end 106, 206 and the handle 108, 208 are separate pieces. In some embodiments, one or both of the first cover 154A and/or the second cover 154B and the handle 108, 208 are one piece. In other embodiments, one or both of the first cover 154A and/or the second cover 154B and the handle 108, 208 are separate pieces. The entire device 100, 200 may be machined, injection molded, or 3D printed, or some pieces may be machined while other pieces are 3D printed or injection molded. The device 100, 200 may be made from one material or may include a combination of materials.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A device for flossing teeth comprising:
a body having a bottom end, a top end opposite the bottom end, a right side, a left side, a center axis disposed between the left side and the right side, a front surface, and a rear surface opposite the front surface, the body having a U-shaped head proximate the top end and a handle extending from the bottom end to a bottom portion of the head, the U-shaped head comprising:
   a first leg with a first distal end and a first groove proximate the first distal end, wherein the first groove receives a first portion of dental floss; and
   a second leg with a second distal end and a second groove proximate the second distal end, wherein the second groove receives a second portion of the dental floss, wherein the first and second legs are positioned at an angle relative to a front surface of the handle, and
   wherein the first and second legs are offset an equal distance from the center axis of the body;
a first upper protuberance comprising a first cylindrical stem portion with a first stem diameter extending outward from the left side of the body proximate the bottom portion of the head, and comprising a first spherical cap portion with a first cap diameter interconnected to a distal end of the first cylindrical stem portion, the first cap diameter being greater than the first stem diameter;
a second upper protuberance comprising a second cylindrical stem portion with a second stem diameter extending outward from the right side of the body proximate the bottom portion of the head, and comprising a second spherical cap portion with a second cap diameter interconnected to a distal end of the second cylindrical stem portion, the second cap diameter being greater than the second stem diameter;
a first cover that engages a portion of the first upper protuberance; and
a second cover that engages a portion of the second upper protuberance.

2. The device for flossing teeth according to claim 1, wherein the first upper protuberance extends from the left side of the body at an angle relative to the center axis and the second upper protuberance extends from the right side of the body at the angle relative to the center axis.

3. The device for flossing teeth according to claim 1, further comprising:
a first lower protuberance extending outward from the left side of the body and positioned a predetermined distance below the first upper protuberance; and
a second lower protuberance extending outward from the right side of the body and positioned the predetermined distance below the second upper protuberance.

4. The device for flossing teeth according to claim 3, wherein the first groove has a first substantially flat surface extending from the first distal end of the first leg and forming an upper limit of the first groove, the first substantially flat surface interconnected to a curved innermost portion, which is interconnected to a second substantially flat surface extending from the curved innermost portion to a step portion formed by a substantially perpendicular surface interconnected to the second substantially flat surface and a third substantially flat surface, the third substantially flat surface extending from the substantially perpendicular surface to the first distal end of the first leg, wherein the second and third substantially flat surfaces form a lower limit of the first groove, and wherein the second groove has a first substantially flat surface extending from the second distal end of the second leg and forming an upper limit of the second groove, the first substantially flat surface of the second groove interconnected to a curved innermost portion, which is interconnected to a second substantially flat surface extending from the curved innermost portion of the second groove to a step portion formed by a substantially perpendicular surface interconnected to the second substantially flat surface of the second groove and a third substantially flat surface, the third substantially flat surface of the second groove extending from the substantially perpendicular surface of the second groove to the second distal end of the second leg, wherein the second and third substantially flat surfaces of the second groove form a lower limit of the second groove.

5. The device for flossing teeth according to claim 3, wherein
the first cover comprises a first aperture that engages a portion of the first upper protuberance and a second aperture that engages a portion of the first lower protuberance; and
the second cover comprises a first aperture that engages a portion of the second upper protuberance and a second aperture that engages a portion of the second lower protuberance.

6. The device for flossing teeth according to claim 1, further comprising a pad positioned on the front surface of the handle proximate the bottom portion of the head.

7. A flossing device comprising:
a body extending from a first end to a second end and having a head proximate the second end and a handle extending from the first end to a junction with the head, the handle having a midpoint with a cross-section greater than a cross-section of the first end and the junction, the handle tapering from the midpoint to the first end and the junction;
a first leg and a second leg positioned at the second end of the body and spaced apart from each other, the first and second legs having distal ends, wherein a portion of the first leg proximate its distal end is substantially parallel to a portion of the second leg proximate its distal end, the first leg having a first tip and having a first groove proximate its distal end, the first groove extending from a first tip end surface of the distal end and into the first leg, the second leg having a second tip and having a second groove proximate its distal end, the second groove extending from a second top end surface of the distal end and into the second leg, wherein the first and second grooves are operable to receive a portion of floss;
the first groove extending inward from the first end surface of the distal end of the first leg, wherein the first groove has a first substantially flat surface extending from the distal end of the first leg and forming an upper limit of the first groove, the first substantially flat surface interconnected to a curved innermost portion, which is interconnected to a second substantially flat surface extending from the curved innermost portion to a step portion formed by a substantially perpendicular surface interconnected to the second substantially flat surface and a third substantially flat surface, the third substantially flat surface extending from the substantially perpendicular surface to the distal end of the first leg, wherein the second and third substantially flat surfaces form a lower limit of the first groove;
second groove extending inward from the second top end surface of the distal end of the second leg, wherein the second groove has a first substantially flat surface extending from the distal end of the second leg and forming an upper limit of the second groove, the first substantially flat surface of the second groove interconnected to a curved innermost portion, which is interconnected to a second substantially flat surface extending from the curved innermost portion of the second groove to a step portion formed by a substantially perpendicular surface interconnected to the second substantially flat surface of the second groove and a third substantially flat surface, the third substantially flat surface of the second groove extending from the substantially perpendicular surface of the second groove to the distal end of the second leg, wherein the second and third substantially flat surfaces of the second groove form a lower limit of the second groove;

a first upper protuberance and a second upper protuberance disposed on opposite surfaces of the body and near the junction, each of the first upper protuberance and the second upper protuberance having a retainer portion extending from a body surface and a stop portion interconnected to a distal end of the retainer portion, each retainer portion operable for receiving a portion of the floss; and a first cover securable to the first upper protuberance and a second cover securable to the second upper protuberance, the first cover and the second cover operable to secure portions of the floss to the corresponding first and second upper protuberances, wherein the stop portion of the first upper protuberance is securable to the first cover when the first cover is disposed on the retainer portion of the first upper protuberance, and wherein the stop portion of the second upper protuberance is securable to the second cover when the second cover is disposed on the retainer portion of the second upper protuberance.

8. The flossing device of claim 7, wherein the retainer portion of the first upper protuberance is a cylindrical stem and the stop portion of the first upper protuberance is a sphere with a larger diameter than a diameter of the cylindrical stem.

9. The flossing device of claim 7, wherein each of the first leg and the second leg comprise a first protrusion, a second protrusion formed by an interior surface, wherein a front surface of the first protrusion is curved and a rear surface of the second protrusion is curved.

10. The flossing device of claim 9, wherein the first cover includes a first aperture, wherein the retainer portion of the first upper protuberance is positioned in the first aperture when the first cover is disposed on the retainer portion of the first upper protuberance, wherein the second cover includes a second aperture, wherein the retainer portion of the second upper protuberance is positioned in the second aperture when the second cover is disposed on the retainer portion of the second upper protuberance.

11. The flossing device of claim 7, wherein the first leg and the second leg are offset an equal distance from a center axis of the body.

12. The flossing device of claim 7, further comprising a pad disposed on a front surface and positioned proximate the junction, wherein the front surface extends between opposite surfaces on which the first and second upper protuberances are disposed.

13. A flossing device comprising:
a body extending from a first end to a second end, the first end having a head comprising a first leg spaced apart from a second leg to define a gap distance;
a first groove extending from a first tip of the first leg and extending into the first leg at a groove distance;
a second groove extending from a second tip of the second leg and extending into the second leg at the groove distance, the first groove and the second groove operable to receive a piece of floss that spans the gap distance;
a mid-portion of the body having a first cross-section;
a second portion positioned proximate the second end and having a second cross-section less than the first cross-section of the mid-portion;
a handle defined by the body tapering from the mid-portion to the second portion and by the body tapering from the mid-portion to the head;
a first pair of extensions each disposed on opposite sides of the body and operable to receive a first portion and a second portion of the piece of floss, the first pair of extensions positioned proximate a lower portion of the head and each extension in the first pair of extensions being positioned a same distance below the first end;
a second pair of extensions spaced a predetermined distance below the first pair of extensions, each extension in the second pair of extensions being disposed on the opposite sides of the body and operable to receive a third portion and a fourth portion of the piece of floss;
a first cover configured to detachably engage one extension in the first pair of extensions and one extension in the second pair of extensions; and
a second cover configured to detachably engage the other extension in the first pair of extensions and the other extension in the second pair of extensions.

14. The flossing device of claim 13, wherein the head has a U-shape in part formed by the first leg and the second leg.

15. The flossing device of claim 13, wherein each extension in the first pair of extensions and each extension in the second pair of extensions have a cylindrical stem portion extending from the opposite sides of the body and a spherical cap portion interconnected to a distal end of the cylindrical stem portion.

16. The flossing device of claim 13, wherein the first groove and the second groove each includes a step for preventing the piece of floss from moving out of the first and second grooves.

17. The flossing device of claim 13, wherein the first cover includes a first aperture configured to receive one extension in the first pair of extensions and a second aperture configured to receive one extension in the second pair of extensions, and wherein the second cover includes a first aperture configured to receive the other extension in the first pair of extensions and a second aperture configured to receive the other extension in the second pair of extensions.

18. The flossing device of claim 13, wherein the first groove has a first substantially flat surface extending from the first tip of the first leg and forming an upper limit of the first groove, the first substantially flat surface interconnected to a curved innermost portion, which is interconnected to a second substantially flat surface extending from the curved innermost portion to a step portion formed by a substantially perpendicular surface interconnected to the second substantially flat surface and a third substantially flat surface, the third substantially flat surface extending from the substantially perpendicular surface to the first tip of the first leg, wherein the second and third substantially flat surfaces form a lower limit of the first groove, and wherein the second groove has a first substantially flat surface extending from the second tip of the second leg and forming an upper limit of the second groove, the first substantially flat surface of the second groove interconnected to a curved innermost portion, which is interconnected to a second substantially flat surface extending from the curved innermost portion of the second groove to a step portion formed by a substantially perpendicular surface interconnected to the second substantially flat surface of the second groove and a third substantially flat surface, the third substantially flat surface of the second groove extending from the substantially perpendicular surface of the second groove to the second tip of the second leg, wherein the second and third substantially flat surfaces of the second groove form a lower limit of the second groove.

19. The flossing device of claim 13, wherein the first cover and the second cover are permanently affixed to the second pair of extensions and removably securable to the first pair of extensions.

* * * * *

UNITED STATES PATENT AND TRADEMARK OFFICE
CERTIFICATE OF CORRECTION

| | | |
|---|---|---|
| PATENT NO. | : 11,553,997 B2 | Page 1 of 1 |
| APPLICATION NO. | : 16/888268 | |
| DATED | : January 17, 2023 | |
| INVENTOR(S) | : David Rollman | |

It is certified that error appears in the above-identified patent and that said Letters Patent is hereby corrected as shown below:

In the Claims

Claim 7, Column 20, Line 44: delete "a first tip end" and insert --a first top end--

Claim 7, Column 20, Line 51: delete "the first end" and insert --the first top end--

Signed and Sealed this
Eighteenth Day of July, 2023

Katherine Kelly Vidal
*Director of the United States Patent and Trademark Office*